US012678876B2

(12) United States Patent
Johnson et al.

(10) Patent No.: US 12,678,876 B2
(45) Date of Patent: Jul. 14, 2026

(54) RESISTIVE HEATING WIRE TERMINATION SYSTEM

(71) Applicant: Onanon, Inc., Milpitas, CA (US)

(72) Inventors: Dennis J. Johnson, Milpitas, CA (US); Keyon Keshtgar, Milpitas, CA (US); Michael J. Juri, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 927 days.

(21) Appl. No.: 17/968,507

(22) Filed: Oct. 18, 2022

(65) Prior Publication Data

US 2024/0123530 A1     Apr. 18, 2024

(51) Int. Cl.
*B23K 1/00*       (2006.01)
*B23K 101/38*   (2006.01)
*H01R 4/02*     (2006.01)

(52) U.S. Cl.
CPC ........... *B23K 1/0004* (2013.01); *H01R 4/024* (2013.01); *B23K 2101/38* (2018.08)

(58) Field of Classification Search
CPC .. B23K 1/0004; B23K 3/053; B23K 2101/38; B23K 1/0016; H01R 4/024; H01R 4/42; H01R 43/02; H05B 3/22; H05B 3/42
See application file for complete search history.

(56) References Cited

U.S. PATENT DOCUMENTS 2,951,146 A  *  8/1960  Gothe .................. B23K 1/0004
                                                      219/79
3,283,119 A  * 11/1966  Hromadka ........... B23K 1/0004
                                                      165/185
3,418,544 A    12/1968  France
                  (Continued)

FOREIGN PATENT DOCUMENTS

GB         1499678 A      2/1978
JP        56102370 A      8/1981
                  (Continued)

OTHER PUBLICATIONS

PCT International Preliminary Report on Patentability and Written Opinion for PCT/US2015/0271111; Received Nov. 2, 2017.
(Continued)

*Primary Examiner* — Thomas J Hong
*Assistant Examiner* — Jose K Abraham
(74) *Attorney, Agent, or Firm* — Neustel Law Offices

(57)       ABSTRACT

A wire termination system includes a heat applicator device to apply resistive heating to a specific connector pin of an electrical connector for the soldering of a wire to the connector pin. In operation, a wire of a cable is inserted into an interior cavity of the connector pin and resistive heating is applied to the connector pin resulting in the melting of solder contained within the interior cavity. Upon stoppage of the resistive heating by the heat applicator device, the solder within the interior cavity of the connector pin solidifies about the wire to form an electrical connection between the wire and the connector pin. The heat applicator device may then be repositioned to apply resistive heating to each additional connector pin of the electrical connector until all wires of the cable are soldered to their corresponding connector pins on the electrical connector.

18 Claims, 8 Drawing Sheets

(56) References Cited

U.S. PATENT DOCUMENTS

| | | | |
|---|---|---|---|
| 3,569,607 A * | 3/1971 | Martyak | H05K 3/3421 |
| | | | 228/180.1 |
| 3,608,190 A | 9/1971 | Steranko | |
| 3,820,055 A * | 6/1974 | Huffnagle | H01R 12/675 |
| | | | 439/752 |
| 4,332,083 A | 6/1982 | Johnson, Jr. | |
| 4,339,651 A * | 7/1982 | Kraus | B23K 11/3009 |
| | | | 228/208 |
| 4,632,294 A | 12/1986 | Druschel | |
| 4,774,760 A | 10/1988 | Seaman | |
| 4,842,184 A | 6/1989 | Miller, Jr. | |
| 4,922,082 A * | 5/1990 | Bredt | H05B 3/42 |
| | | | 219/541 |
| 4,987,283 A | 1/1991 | Beinhaur | |
| 5,032,703 A * | 7/1991 | Henschen | H01R 43/0242 |
| | | | 219/616 |
| 5,092,035 A | 3/1992 | McMichen | |
| 5,145,104 A | 9/1992 | Apap | |
| 5,163,856 A | 11/1992 | McGaffigan | |
| 5,269,056 A | 12/1993 | Yang | |
| 5,634,821 A | 6/1997 | Crane, Jr. | |
| 5,651,178 A | 7/1997 | Sasse | |
| 5,782,401 A | 7/1998 | Hinrichs | |
| 5,808,259 A | 9/1998 | Spinner | |
| 6,137,075 A * | 10/2000 | Grabowski | H01R 43/0214 |
| | | | 219/56.22 |
| 6,142,787 A | 11/2000 | Ikesugi | |
| 6,179,631 B1 | 1/2001 | Downes | |
| 6,224,399 B1 | 5/2001 | Yacoub | |
| 6,266,870 B1 | 7/2001 | Wollermann | |
| 6,392,888 B1 | 5/2002 | Chen | |
| 6,818,839 B2 | 11/2004 | Hosaka | |
| 6,822,867 B2 | 11/2004 | Hsieh | |
| 6,887,104 B2 | 5/2005 | Lee | |
| 6,945,814 B2 | 9/2005 | Snape | |
| 6,974,615 B2 | 12/2005 | Hosaka | |
| 7,973,239 B2 | 7/2011 | Koyama | |
| 8,474,681 B1 * | 7/2013 | Pereira | B23K 1/0016 |
| | | | 228/41 |
| 9,190,795 B2 * | 11/2015 | Johnson | B23K 3/08 |
| | | | 901/42 |
| 9,629,259 B1 | 4/2017 | Hart | |
| 9,904,259 B2 | 2/2018 | Bando | |
| 10,239,164 B2 | 3/2019 | Johnson | |
| 10,868,401 B1 | 12/2020 | Johnson | |
| 11,161,205 B1 | 11/2021 | Johnson | |

| | | | |
|---|---|---|---|
| 2002/0077003 A1 | 6/2002 | Northey | |
| 2002/0139580 A1 * | 10/2002 | Hosaka | H01R 43/24 |
| | | | 174/262 |
| 2002/0179692 A1 | 12/2002 | Tung | |
| 2002/0190107 A1 | 12/2002 | Shah | |
| 2004/0144834 A1 | 7/2004 | Nomoto | |
| 2004/0232204 A1 | 11/2004 | Wolf | |
| 2008/0155823 A1 | 7/2008 | Heinzel | |
| 2008/0280495 A1 | 11/2008 | Ko | |
| 2009/0080140 A1 | 3/2009 | Iyer | |
| 2010/0038358 A1 | 2/2010 | Dingle | |
| 2011/0113626 A1 | 5/2011 | Ng | |
| 2011/0124215 A1 | 5/2011 | Yin | |
| 2011/0272126 A1 | 11/2011 | Hamlyn | |
| 2011/0308850 A1 | 12/2011 | Ni | |
| 2014/0201989 A1 | 7/2014 | Paynter | |
| 2014/0298898 A1 | 10/2014 | Yang | |
| 2014/0345123 A1 * | 11/2014 | Chamberlin | B23K 1/0016 |
| | | | 29/830 |
| 2015/0077962 A1 | 3/2015 | Mirpuri | |
| 2015/0098178 A1 | 4/2015 | Otake | |
| 2015/0107103 A1 | 4/2015 | Johnson | |
| 2015/0202706 A1 | 7/2015 | Brosnan | |
| 2015/0229088 A1 * | 8/2015 | Johnson | B23K 3/08 |
| | | | 901/42 |
| 2015/0290736 A1 | 10/2015 | Zhang | |
| 2016/0207131 A1 | 7/2016 | Endress | |
| 2017/0100795 A1 | 4/2017 | Wu | |
| 2018/0272479 A1 | 9/2018 | Hori | |
| 2019/0123463 A1 | 4/2019 | Lee | |
| 2020/0036148 A1 | 1/2020 | Huang | |
| 2021/0281034 A1 | 9/2021 | Johnson | |
| 2022/0048143 A1 | 2/2022 | Johnson | |
| 2022/0143728 A1 | 5/2022 | Johnson | |

FOREIGN PATENT DOCUMENTS

| | | | |
|---|---|---|---|
| JP | 02309581 A | 12/1990 | |
| JP | 2012084686 A | 4/2012 | |
| KR | 200291242 Y1 | 10/2002 | |
| WO | 09921676 A1 | 5/1999 | |

OTHER PUBLICATIONS

PCT International Search Report and Written Opinion for PCT/US2015/0271111; Received Jul. 30, 2015.

* cited by examiner

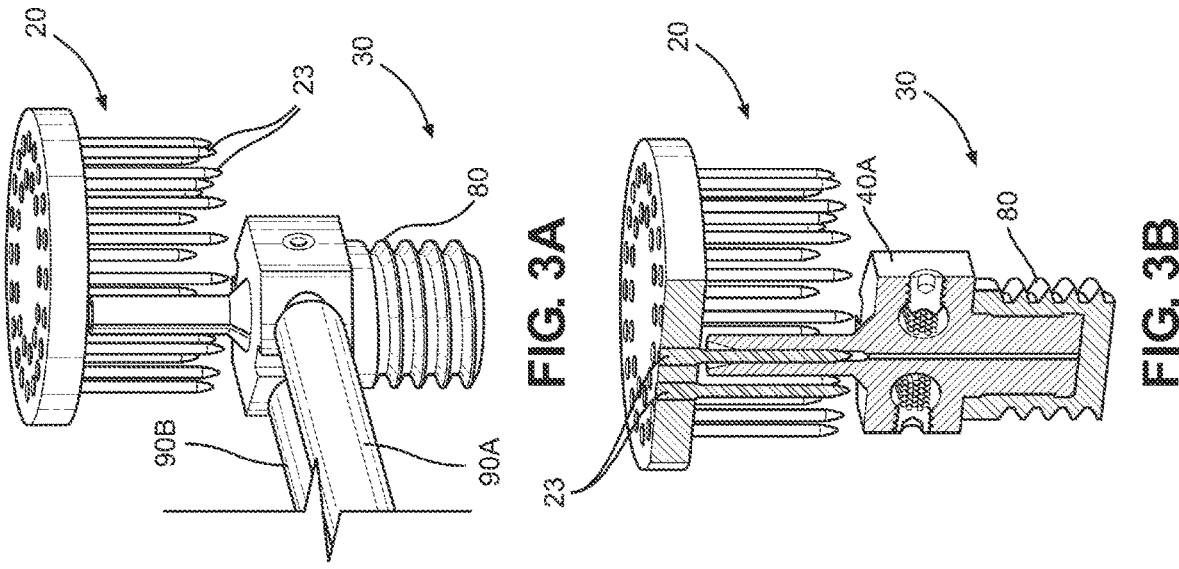
FIG. 3A
FIG. 3B
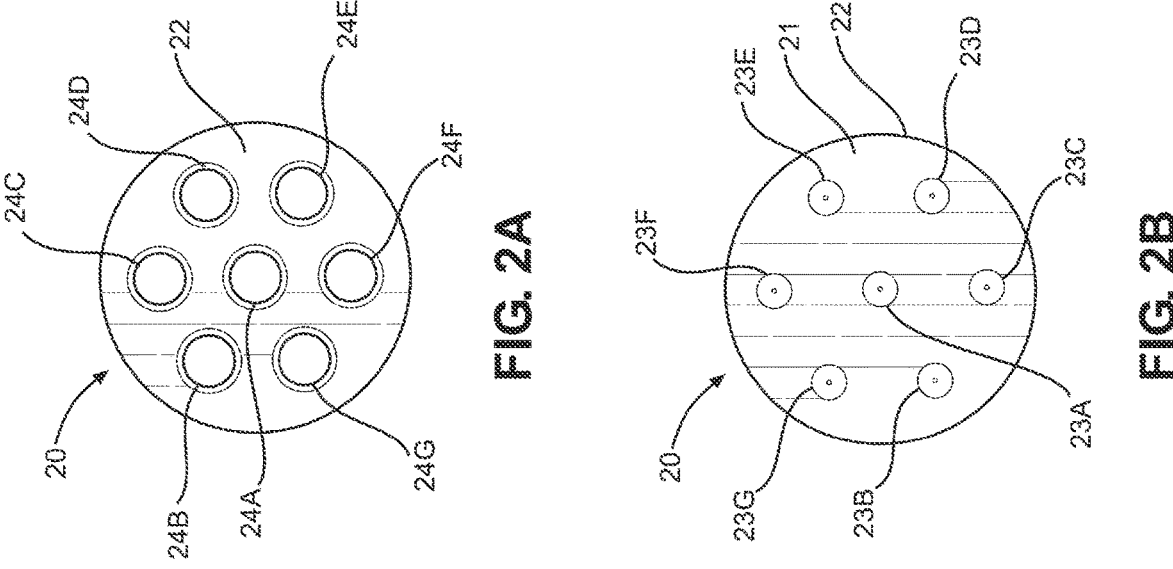
FIG. 2A
FIG. 2B

RESISTIVE HEATING WIRE TERMINATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to wire termination and, more specifically, to terminating wires at an electrical connector through use of resistive heating.

There are various types of electrical connectors used today including but not limited to fine wire terminations, pinned connectors, terminal blocks, plug and socket connectors, medical connectors, transition devices and custom connectors. Conventional electrical connectors include a plurality of connector pins that have a corresponding plurality of wires from a cable that must be soldered together according to a pinout which cross-references the wires to the connector pins. Today, technicians manually connect each individual wire to a corresponding connector pin on the electrical connector. The number of connector pins on a connector range from 2 to greater than 100 connector pins which receive a corresponding number of wires.

Medical probes typically have numerous connector pins within an electrical connector that require a corresponding number of fine wires to be connected to. For example, modern catheters may contain more than 120 40-gauge wires connecting medical transducers. A skilled technician manually connects each of the fine wires to a corresponding connector pin on the electrical connector utilizing a soldering device (e.g., soldering iron or soldering gun). The technician must identify a fine wire and a corresponding connector pin where the fine wire will be connected to. After identifying the proper connection point for the fine wire, the technician then must position the fine wire adjacent to the connector pin and then heats the solder with the soldering device to melt upon both the fine wire and the connector pin. Once the technician removes the soldering device, the melted solder solidifies thereby physically and electrically connecting the fine wire to the connector pin. The technician manually repeats this process for each individual fine wire until all the fine wires are connected.

As can be appreciated, the manual process of soldering a plurality of wires to an electrical connector is labor intensive, time consuming, costly, and creates a significant amount of discarded material. Errors by technicians soldering wires to electrical connectors are common with error rates approaching 25% with some medical connectors where the wires are very thin and where a single mistake typically results in the complete loss of the connector. For example, technicians may mistakenly connect a wire to an incorrect connector pin thereby resulting in a defective electrical connector being produced thereby requiring additional time to fix or the complete loss of the electrical connector. Errors by technicians are further compounded by the increasingly smaller wires used in electrical connectors today, particularly in the medical industry, where some devices require 100 or more connector pins within a square centimeter. To make matters worse for technicians, they must often connect extremely fine wires having a 40-gauge or 50-gauge size.

Because of the inherent problems with conventional wire termination systems, there is a need for a new and improved wire termination system for efficiently connecting a plurality of wires to an electrical connector.

SUMMARY

The invention generally relates to a wire termination system that includes a heat applicator device to apply resistive heating to a specific connector pin of an electrical connector enabling a wire to be soldered to the connector pin. In operation, a wire of a cable is inserted into an interior cavity of the connector pin and resistive heating is applied to the connector pin resulting in the melting of solder contained within the interior cavity. Upon stoppage of the resistive heating the solder within the interior cavity of the connector pin solidifies about the wire to form an electrical connection between the wire and the connector pin. The heat applicator device may then be repositioned to apply resistive heating to a second connector pin of the electrical connector. The process of moving the heat applicator device to another of the connector pins of the electrical connector continues until all wires are soldered to their corresponding connector pins on the electrical connector. In an alternative embodiment, the heat applicator device remains in a stationary position while the electrical connector is repositioned to present each connector pin, respectively to the heat applicator device for resistive heating.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 2A is a top view of an exemplary electrical connector.

FIG. 2B is a bottom view of the exemplary electrical connector.

FIG. 3A is a perspective view of a heat applicator device in a position to provide resistive heating to one of a plurality of pins of an electrical connector.

FIG. 3B is a cross-sectional view illustrating a position of the pin of the electrical connector relative to the heat applicator device.

DETAILED DESCRIPTION

A. Overview

Figure 1:
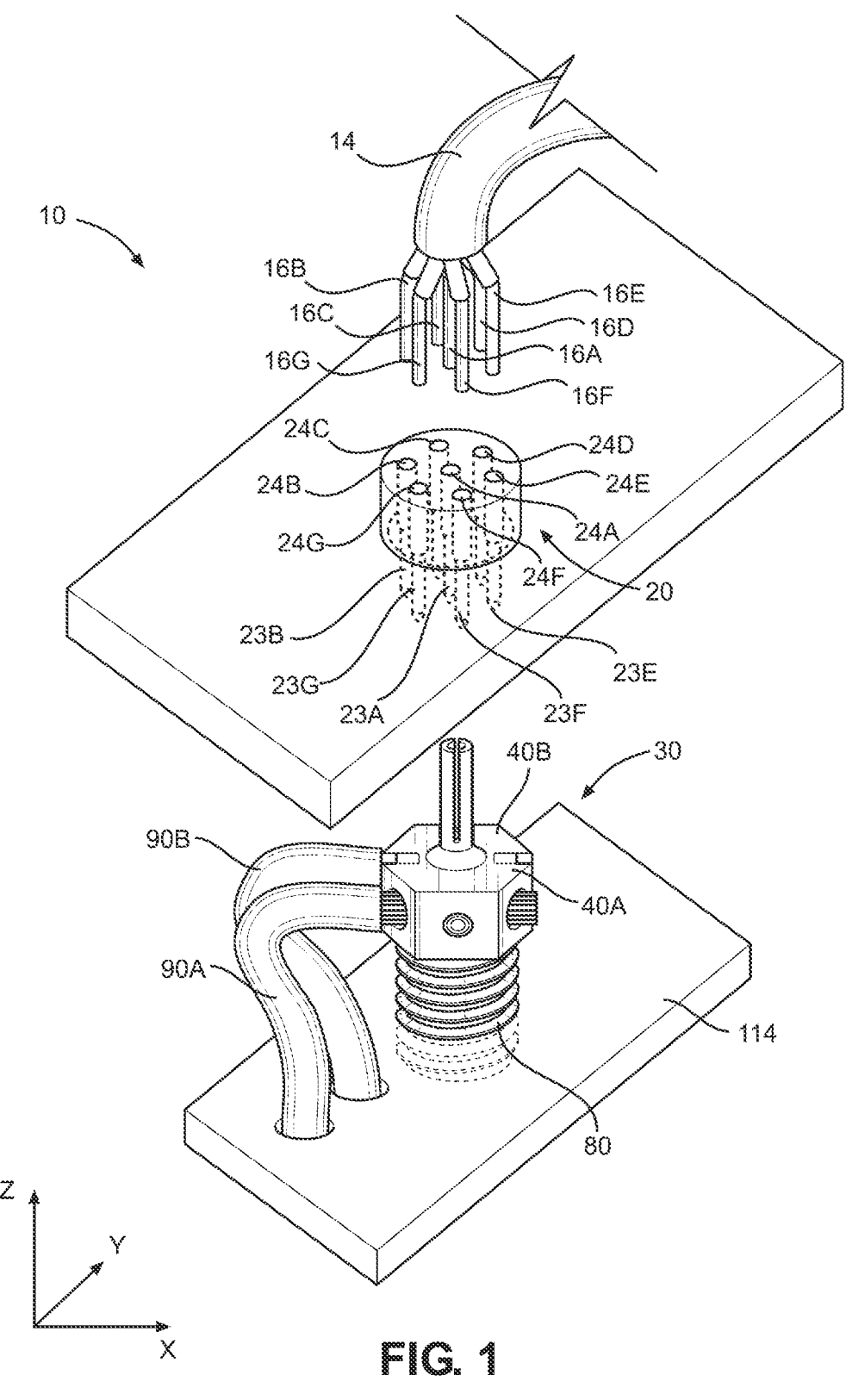
FIG. 1 is a perspective view of a heat applicator device of the present disclosure relative to an exemplary electrical connector and a plurality of wires of a cable that are to be connected to respective connector pins of the electrical connector.

Referring to FIGS. 1-7, the invention generally relates to a wire termination system 10 that includes a heat applicator device 30 to apply resistive heating to a specific connector pin 23A-G within an electrical connector 20 enabling a wire 16A-G to be soldered to the connector pin 23A-G. In operation, a wire 16A-G of a cable 14 is inserted into an interior cavity of the connector pin 23A-G and resistive heating is applied to the connector pin 23A-G resulting in the melting of solder 12 contained within the interior cavity. Upon stoppage of the resistive heating delivered by the heat applicator device 30, the solder 12 within the interior cavity of the connector pin 23A-G solidifies about the wire 16A-G to form an electrical connection between the wire 16A-G and the connector pin 23A-G. The heat applicator device 30 may then be repositioned to apply resistive heating to a second connector pin 23A-G of the electrical connector 20. The process of repositioning the heat applicator device 30 relative to another of the connector pins of the electrical connector 20 continues until all wires 16A-G are soldered to their corresponding connector pins 23A-G on the electrical connector 20.

In an alternative embodiment, the heat applicator device 30 remains in a stationary position while the electrical connector 20 is repositioned to present each connector pin 23A-G and corresponding wire 16A-G, respectively, to the heat applicator device 30 for resistive heating.

The narrow single pin receptacle configuration of the heat applicator device 30 along with the repositioning ability of the heat applicator device 30 (alternatively, the repositioning ability of the electrical connector 20) enables the heat applicator device 30 to apply one-by-one resistive heating to a plurality connector pins of an electrical connector even when the plurality of connector pins are closely positioned to one another.

B. Electrical Connector

The electrical connector 20 may be comprised of any device at which wires 16A-G are terminated. There are various types of electrical connectors 20 used today including, but not limited to, fine wire terminations, pinned connectors, terminal blocks, plug and socket connectors, medical connectors, transition devices and custom connectors. The electrical connector 20 may be for various types of industries such as but not limited to the medical industry.

As illustrated in FIGS. 1 through 2B of the drawings, the electrical connector 20 includes a plurality of connector pins 23A-G that extend through an insulator housing 22. The connector pins 23A-G are comprised of an electrically conductive material such as metal. The insulator housing 22 electrically insulates the respective connector pins 23A-G and supports the connector pins 23A-G. The insulator housing 22 may have various shapes (e.g., circular as illustrated in FIGS. 1 through 2b), thicknesses and sizes.

The connector pins 23A-G are typically parallel with one another and may form various types of shapes and patterns. The number of connector pins 23A-G on an electrical connector 20 may range from 2 connector pins 23A-G to greater than 100 connector pins 23A-G (FIGS. 3A and 3B illustrate an example of an electrical connector with twenty-four pins).

The connector pins 23A-G have a male connecting end that typically has a tapered end or pointed end used to electrically connect the electrical connector 20 to a corresponding electrical socket or the like as best illustrated in FIGS. 1 and 6A through 6e of the drawings. The connecting end typically is comprised of a solid pin structure as illustrated in FIGS. 6B-6E of the drawings. The male connecting end of the connector pins 23A-G extends outwardly from a first side of the insulator housing 22 as illustrated in FIGS. 1, 3A and 3B of the drawings.

The connector pins 23A-G each include a corresponding connector receptacle 24A-G that is positioned opposite of the male connecting end of the connector pins 23A-G. The distal ends of the wires 16A-G are soldered to the connector receptacles 24A-G according to a pinout to form a physical and electrical connection between the same.

FIGS. 1, 2A through 2B, and 6A through 6E illustrate a preferred embodiment of the connector receptacles 24A-G comprised of a female connecting end having a tubular structure. The connector receptacles 24A-G may have a non-tubular structure as long as the connector receptacles 24A-G allow for the soldering of the wires 16A-G. The connector receptacles 24A-G preferably extend outwardly from a second side of the insulator housing 22 of the electrical connector 20 which is opposite of the first side. The connector receptacles 24A-G preferably have an upper opening that may be flush with, recessed or extending past the second side of the insulator housing 22 of the electrical connector 20 as best illustrated in FIG. 2A of the drawings. The connector receptacles 24A-G may all extend the same distance from the second side of the electrical connector 20 as illustrated in FIGS. 1 and 3A through 3B of the drawings or the connector receptacles 24A-G may extend outwardly from the second side at different distances (e.g., centrally located receptacles may extend further outward than receptacles located at an outer edge of the electrical connector, and vice-versa).

As illustrated in FIGS. 6A through 6E, the connector receptacles 24A-G are preferably prefilled with a solder 12 prior to interfacing the electrical connector 20 to the heat applicator device 30 or applying heat to any of the connector pins 23A-G. For example, the interior cavity of the connector receptacles 24A-G may be at least partially filled with solder balls. The prefilling of the connector receptacles 24A-G with solder 12 allows for the electrical connector 20 to be positioned within the heat applicator device 30 and heat to be selectively applied to the connector pins 23A-G without an operator having to manually apply solder 12 to secure the wires 16A-G to the connector receptacles 24A-G.

Various types of solder 12 may be utilized, such as but not limited to, lead solder, lead-free solder, solder balls, solder paste and flux-core solder. The solder 12 may be comprised of various fusible metal alloys that have a relatively low melting point capable of physically and electrically connecting the wires 16A-G to the connector pins 23A-G of the electrical connector 20.

C. Cable and Wires

FIG. 1 illustrates a cable 14 with a plurality of wires 16A-G extending from the tubular insulation of the cable 14. It can be appreciated that the wires 16A-G to be connected to the electrical connector 20 do not have to be part of an insulated cable 14 and instead may be separate of one another without a common sheathing. The wires 16A-G may have various lengths and sizes.

The plurality of wires 16A-G from the cable 14 are soldered to the respective connector pins 23A-G according to a pinout which cross-references the wires 16A-G to the corresponding connector pins 23A-G. The pinout may be a diagram or chart used to reference the specific connector pins 23A-G and corresponding wires 16A-G. The pinout may be color coded, numbered or otherwise coded to assist a technician in positioning the wires 16A-G adjacent to and upon their respective connector pins 23A-G for proper connection of the wires 16A-G to the connector pins 23A-G.

D. Heat Applicator Device

FIGS. 1 and 3A through 6E, illustrate an exemplary heat applicator device utilized to apply resistive heating to the individual connector pins 23A-G sufficient to melt the solder 12 (e.g., in the range of 220 deg. to 360 deg. F.) into a liquid state and enabling the soldering of the wires 16A-G to the connector pins 23A-G. Resistive heating, also known as joule heating, is the process by which the passage of an electric current through a conductor produces heat. The heat applicator device 30 may be a portable device or a non-movable fixture.

As shown, the heat applicator device 30 generally comprises first and second electrodes 40A-B (e.g., a first electrode 40A and a second electrode 40B), an isolation member 70, an electrode support member 80, and first and second electrical conductors 90A-B (e.g., a first electrical conductor 90A and a second electrical conductor 90B).

Figure 5B:
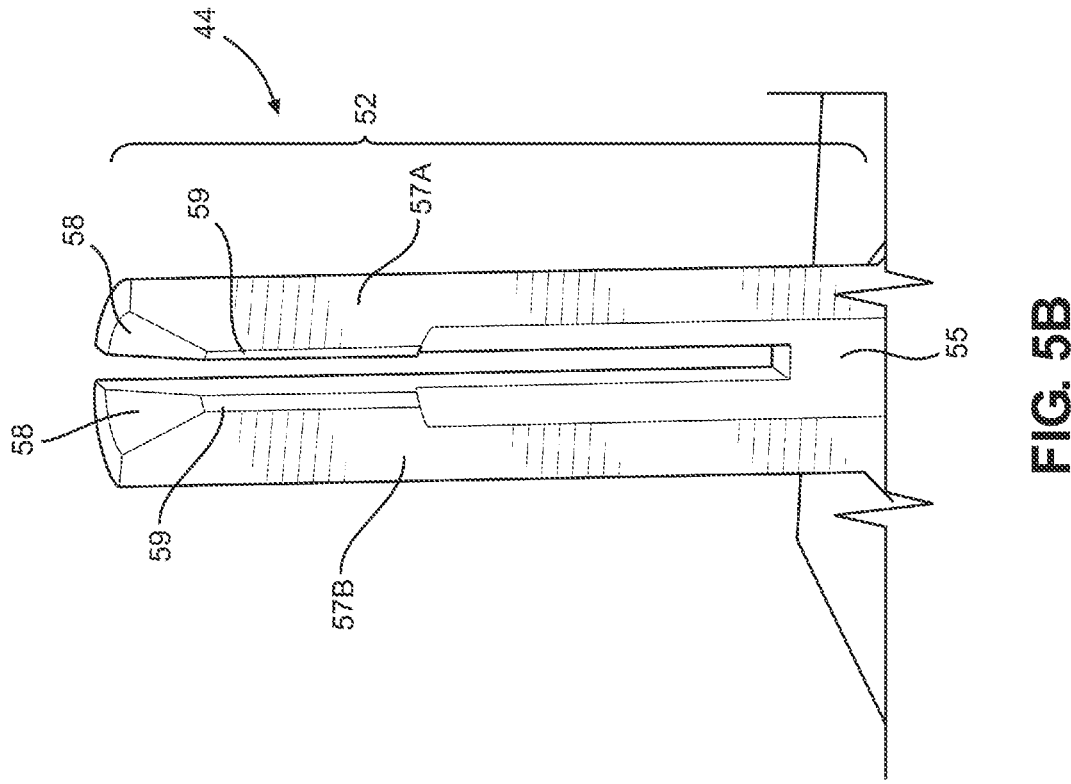
FIG. 5B is close-up view of the one side of a heat receptacle of the heat applicator device.
Figure 5A:
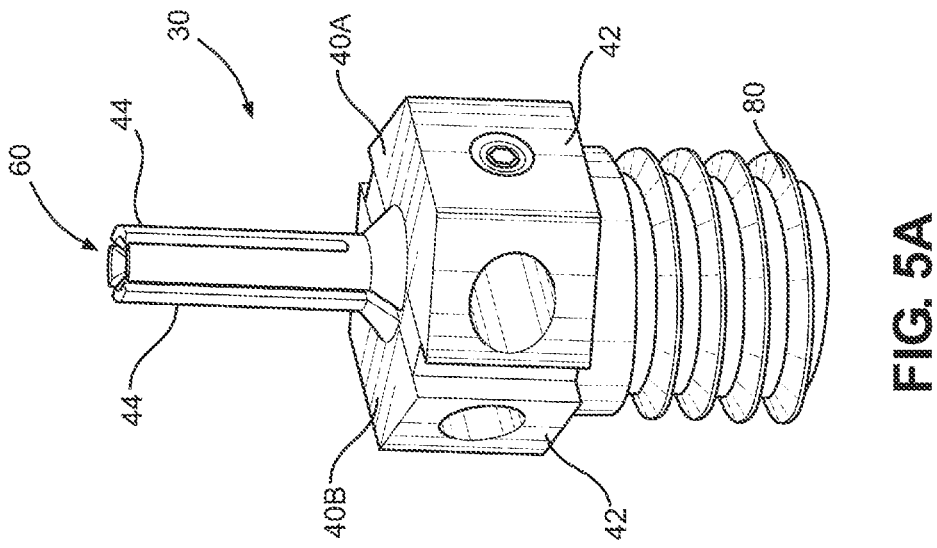
FIG. 5A is a perspective view of a heat applicator device absent first and second wires.
Figure 5C:
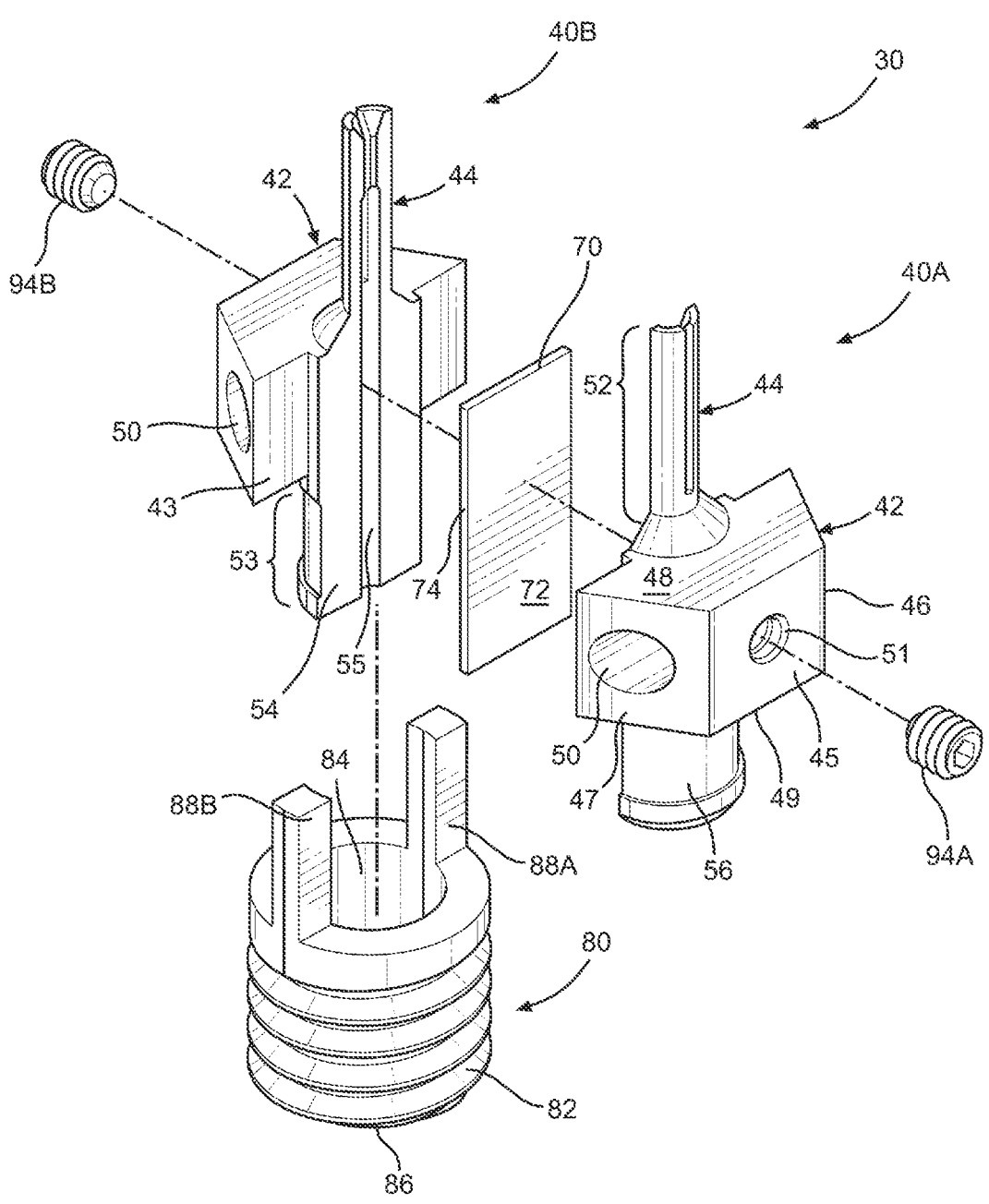
FIG. 5C is an exploded view of the heat applicator device.

As best seen in FIGS. 5A through 5C, each of the first and second electrodes 40A-B is of a unitary configuration having a conductor-receiving portion 42 and a pin-receiving portion 44. In a preferred embodiment, the first and second electrodes 40A-B comprise first and second gold-plated spring steel contacts, however, other materials and/or plating suitable to the application can be used.

Each conductor-receiving portion 42 includes an inner face 43 and an outer face 45 lying parallel to the inner face 43. Each conductor-receiving portion 42 additionally includes a slanted forward face 46 and a slanted rearward face 47 to connect the inner face 43 and outer face 45 in an isosceles trapezoid configuration; an upper face 48 and lower face 49 complete a three-dimensional isosceles trapezoid configuration. It should be noted that the while the isosceles trapezoid configuration is preferred, the conductor-receiving portion 42 may be of other suitable shape configurations. The conductor-receiving portion 42 of each of the first and second electrodes 40A-B additionally includes an open-ended conductor-receiving channel 50, which extends between the slanted forward face 46 and the slanted rearward face 47, and an open-ended threaded side channel 51 that extends between the outer face 45 and the conductor-receiving channel 50.

The pin-receiving portion 44 of each of the electrodes 40A-B extends through the conductor-receiving portion 42 with an upper section 52 extending above the upper face 48 of the conductor-receiving portion 42 and a lower section 53 extending below the lower face 49 of the conductor-receiving portion 42. The pin-receiving portion 44 of each of the electrodes 40A-B is further defined by an inner face 54 having a central channel 55 extending from an end of the lower section 53 through approximately two-thirds of the upper section 52. A base 56 residing behind the inner face 54 and configured to be received by the electrode support member 80 further defines the lower section 53 of the pin-receiving portion 44.

The upper section 52 of the pin-receiving portion 44, as best seen in FIG. 5B, is divided into two prongs 57A-B (e.g., a first prong 57A and a second prong 57B) with each prong 57A-B having an angled entry face 58 leading into a vertical pin-contacting edge 59. When the heat applicator device 30 is fully assembled, the electrodes 40A-B are positioned proximate one another such that the combined upper sections 52 of the two pin-receiving portions 44 form a complete, encircling pin receptacle 60 to receive, one at a time, each of the connector pins 23A-G of the electrical connector 20 for soldering.

The combined four angled entry faces 58 of the prongs 57A-B provide a wider opening and guide to the pin receptacle 60 for the respective connector pin 23A-G being received therein. When the respective connector pin 23A-G is fully received within pin receptacle 60, the four vertical pin contacting edges 59 directly interface with the respective connector pin 23A-G enabling a current to pass from the first electrode 40A through the respective connector pin 23A-G and out the second electrode 40B thereby providing resistive heating of the solder 12 to a liquid form and enabling the corresponding wire 16A-G to be inserted into the solder 12.

Notably, the geometry of each of the first and second electrodes 40A-B can be modified during manufacturing to accommodate different connecting pin 23A-G geometries. For example, the depth of one or more of the pin contacting edges 59 relative to an outer surface of a respective prong 57B-B can be decreased or increased to accommodate a wider or narrow connecting pin. In another example, a length of one or more of the pin contacting edges 59 relative to an upper end of a respective prong 57A-B can be decreased or increased to accommodate a shorter or longer connecting pin. In still another example, a contour of one or more of the pin contacting edges can be modified from a straight vertical configuration to a contoured configuration to accommodate a unique connecting pin shape. Geometries of features of one or both of the first and second electrodes 40A-B, in addition to or other than those of the pin contacting edges 59, can also be modified to accommodate a specific connector pin configuration.

The isolation member 70 serves to electrically isolate the electrodes 40A-B from one another by preventing contact between the lower sections 53 of each of the electrodes 40A-B and by providing a gap between the upper sections 52 of the electrodes 40A-B when the heat applicator device 30 is fully assembled. In a preferred embodiment, the isolation member 70 is made from a glass epoxy laminate having high strength and high dimensional stability over high temperatures, such as a G-11 glass epoxy laminate. As best seen in FIG. 5C, the isolation member 70 is of a rectangular configuration (however, other suitable shapes are also possible) having a first surface 72 that faces the first electrode 40A and a second surface 74 that faces the second electrode 40B. The length of the isolation member 70 is approximately equivalent to a length of the lower section 53 of the pin-receiving portion 44 in combination with a length of the inner face 43 of the wire-receiving portion 42 of the electrodes 40A-B while the width of the isolation member 70 is approximately equivalent to the width of the inner face 54 of the electrodes 40A-B in the lower section 53 of the pin-receiving portion 44 of the electrodes 40A-B.

The electrode support member 80, best seen in FIG. 5C, includes a base 82 have a threaded exterior and a smooth surface central channel 84 that extends through the base 82 to a lower face 86 that encloses the lower end of the base 82. The electrode support member 80 additionally includes a pair of arms 88A-B (e.g., a first arm 88A and a second arm 88B) extending upward from the base 82. In a preferred embodiment, the electrode support member 80 is manufactured from anodized aluminum, which is electrically non-conductive; other suitable electrically non-conductive materials can also be used in manufacture of the electrode support member 80. In a preferred embodiment, the outside diameter of the threaded exterior is approximately six millimeter (e.g., an M6 screw); however, other diameters and thread geometries are also possible.

During assembly of the heat applicator device 30 the isolation member 70 is received within the central channel 84 of the base 82, is positioned intermediate the arms 88A-B, and is in contact with both the arms 88A-B as well as the interior lower face 86 of the base 82. The electrodes 40A-B are received within the central channel 84 of the base 82 to either side of the isolation member 70 such that the inner face 43 of each of the electrodes 40A-B is in contact with each of the arms 88A-B of the base 82; the lower section 53 of the each of the electrodes 40A-B rests upon the interior lower face 86 of the base 82.

Figures 4A, 4B, 4C:
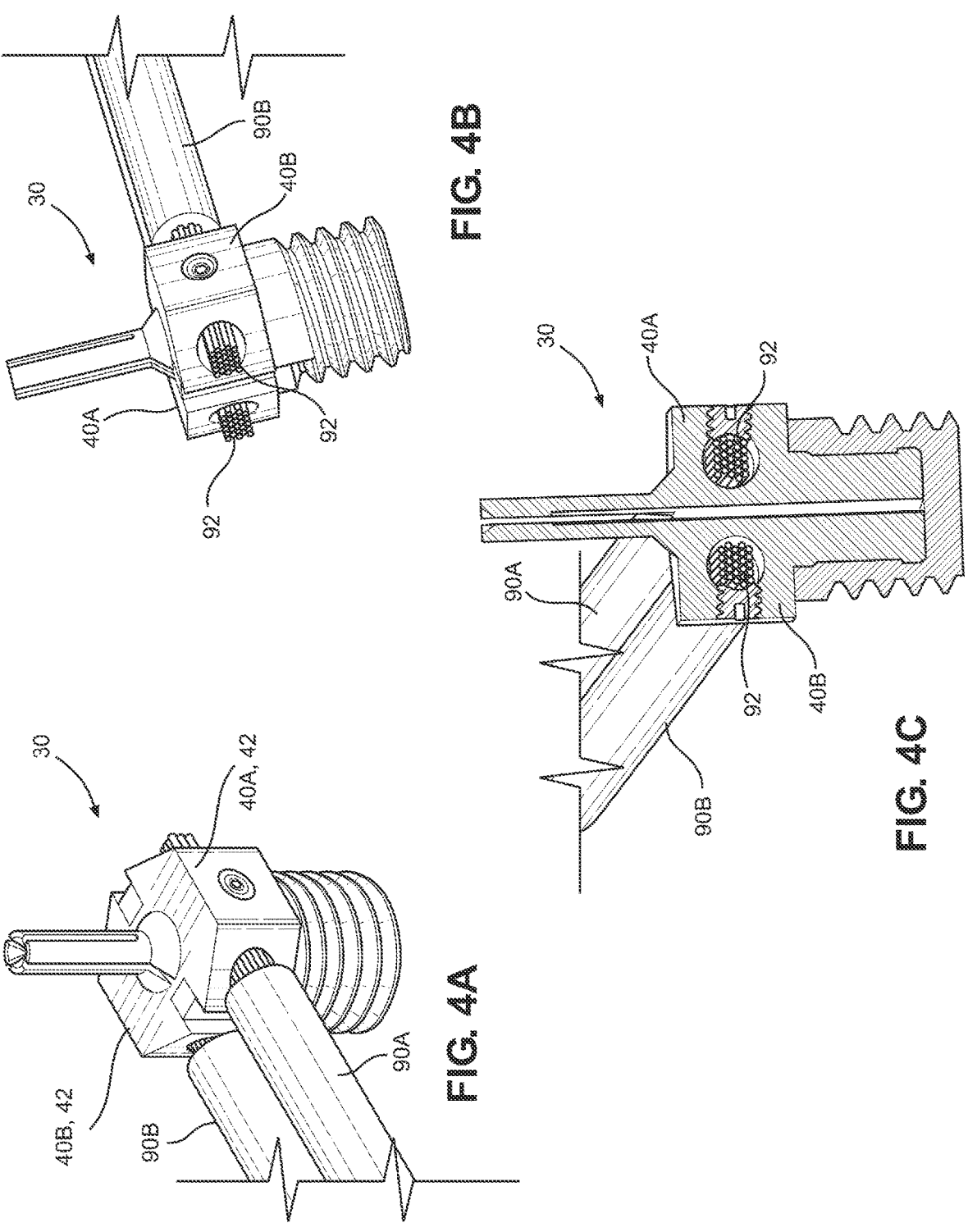
FIG. 4A provides a rear perspective view of a heat applicator device coupled to first and second wires.
FIG. 4B provides a forward perspective view of the heat applicator device.
FIG. 4C provides a perspective cross-sectional view of the heat applicator.

The first and second electrical conductors 90A-B, best seen in FIGS. 4A-4C, provide the current that induces the resistance heating of the heat applicator device 30. In a preferred embodiment, each of the first and second electrical conductors 90A-B comprise a 16 to 20 AWG (American wire gauge) wire having stripped ends 92 that are inserted through respective conductor-receiving channels 50 of each electrode 40A-B; other suitable electrical conductors, for example those with a different wire size, different number of strands or different materials, can also be used. First and second set screws 94A-B (e.g., a #0-80 set screws) are threaded into respective threaded side channels 51 of each electrode 40A-B to hold the first and second electrical conductors 90A-B in position within their respective conductor-receiving channels 50.

E. Operation of Example Embodiment

In use, the wire termination system 10 includes a three-dimensional positioning system to position and reposition one or both of the electrical connector 20 and the heat applicator device 30. Any three-dimensional positioning system suitable to provide the desired positioning of one or both of the electrical connector 20 and heat applicator device 30 as well as suitable to provide (or work in conjunction with a separate system suitable to provide) a desired current to the electrical conductors 90A-B to induce resistive heating can be used. An example configuration of a three-dimensional positioning system is the robotic arm system 100 of FIG. 7 whose operation is directed by a controller 102.

Figure 7:
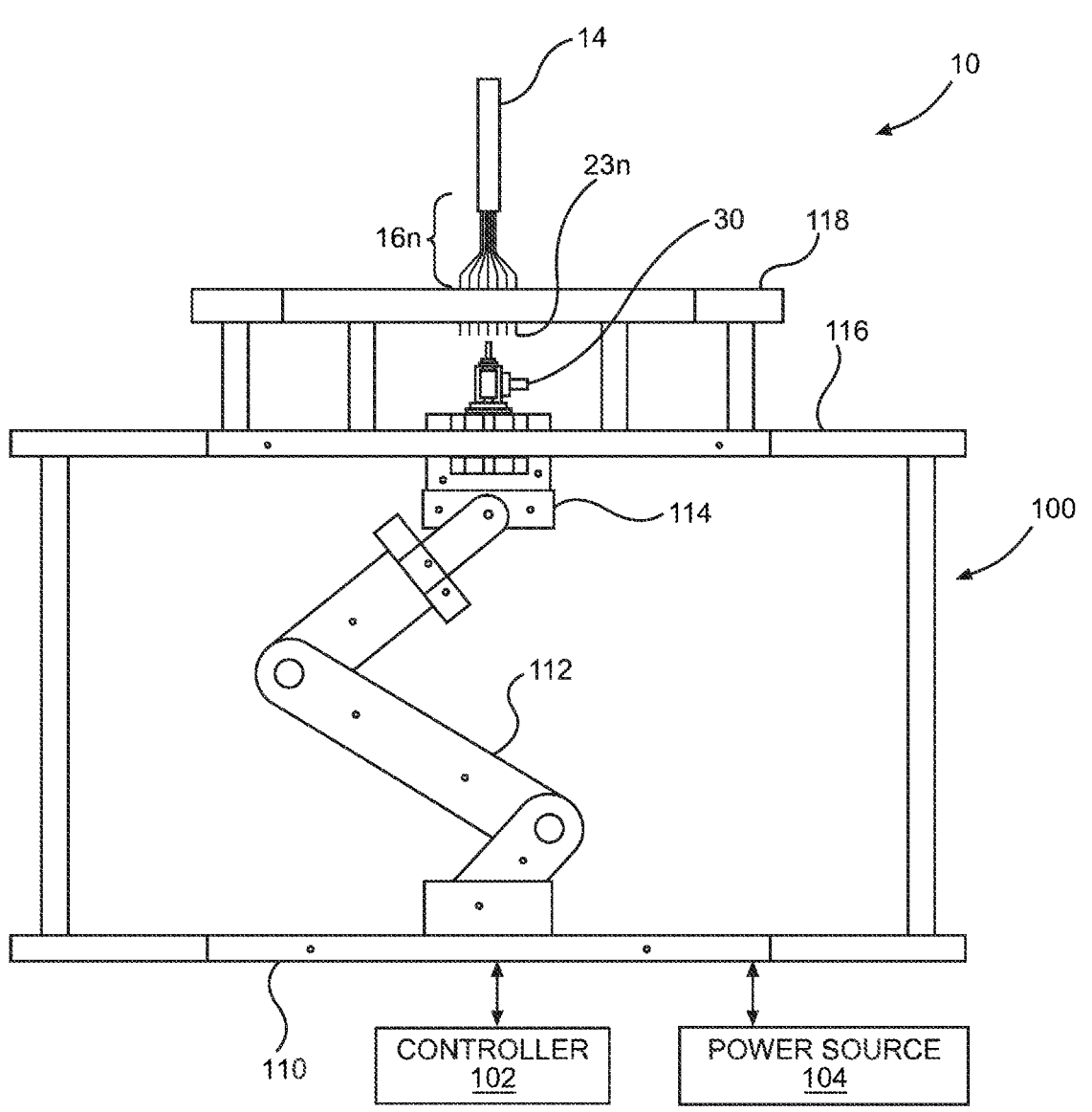
FIG. 7 is an example of a three-dimensional positioning systems capable of moving one or both of a heat applicator device and an electrical connector.

As shown in FIG. 7 with additional reference to FIG. 1, the robotic arm system 100 includes a base 110 that supports a three-dimensional positioning robotic arm 112. The three-dimensional positioning robotic arm 112 is coupled to a heat applicator device support member 114 to which the heat applicator device 30 is removably secured and through which a current can be supplied to one of the electrical conductors 90A-B. The robotic arm system 100 additionally includes an intermediate support member 116 positioned about the heat applicator device support member 114 and an upper support member 118 fixedly secured to the intermediate support member 116. In the illustrated configuration, the upper support member 118 removably receives the electrical connector 20 and maintains the electrical connector 20 in a fixed position while the wires 16$n$ (n number of wires) of the cable 14 are terminated to the connector pins 23$n$ (n number of connector pins) of the electrical connector 20 through resistive heating provided by the heat applicator device 30.

Figure 6A:
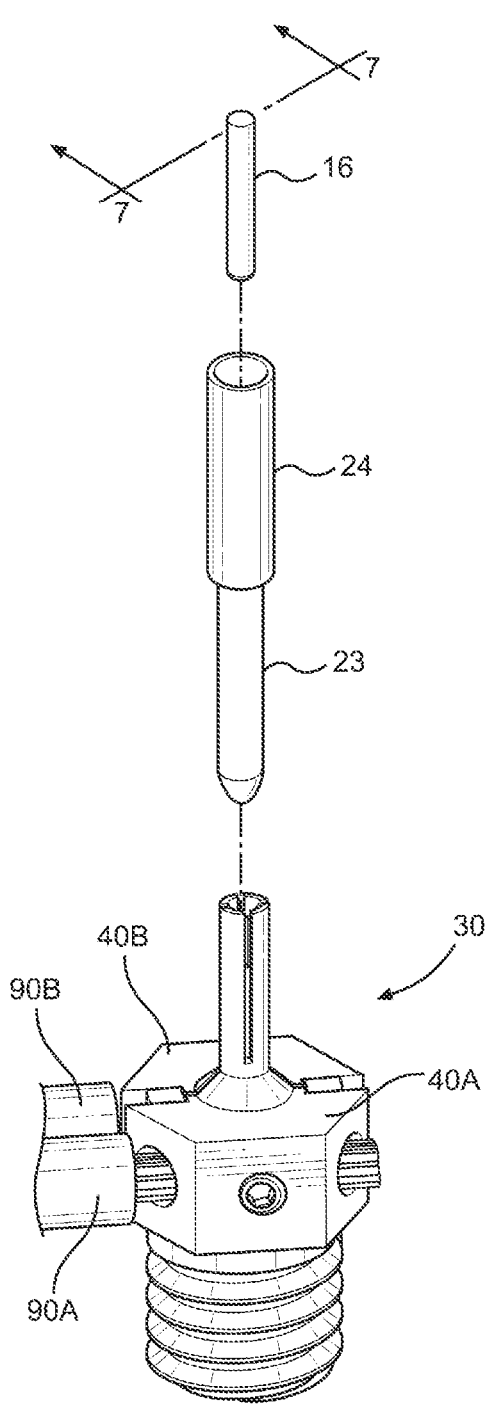
FIG. 6A is an exploded perspective view of a wire with respect to a connector pin.
Figure 6B:
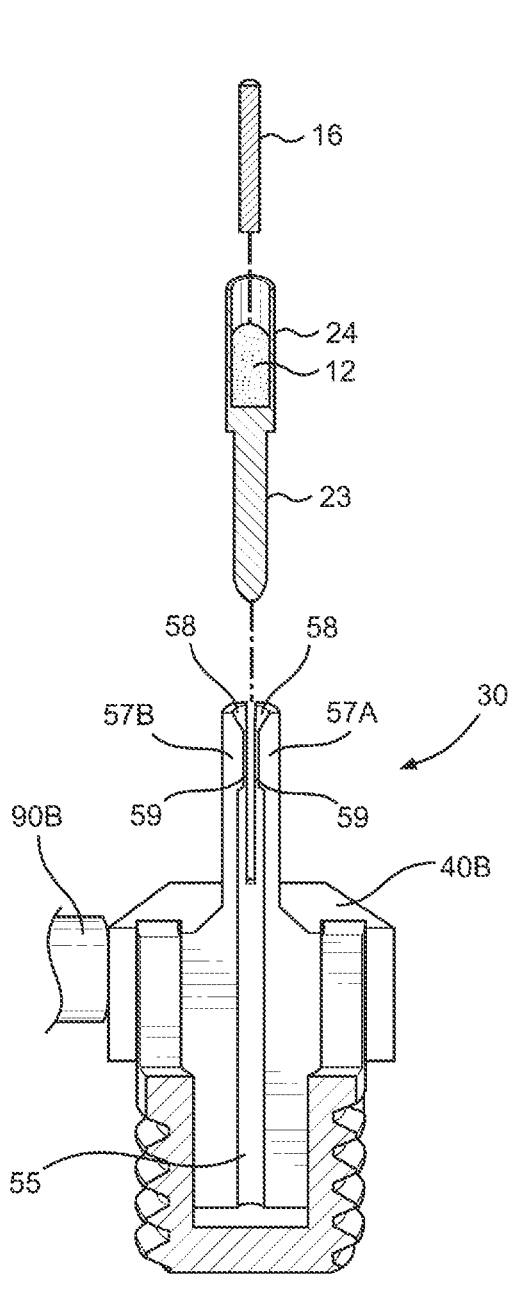
FIG. 6B is a cross-sectional view of the exploded perspective view of a wire with respect to a connector pin.

In operation, the three-dimensional positioning robotic arm 112 is directed by the controller 102 to position the heat applicator device 30 in a location wherein the upper sections 52 of the electrodes 40A-B are positioned immediately beneath one of the connector pins 23 whose corresponding connector receptacle 24 has been at least partially filled with solder 12; a corresponding wire 16 of the cable 14 is aligned with and positioned immediately above the connector receptacle 24, see FIGS. 6A and 6B.

Subsequently, the heat applicator device 30 is repositioned by the three-dimensional positioning robotic arm 112 to receive the connector pin 23 within the four prongs 57B-B of the combined upper sections 52 of the electrodes 40A-B; the prongs 57B-B "hug" the connector pin 23 providing a direct-contact interface between the prongs 57B-B and the connector pin 23 to provide continuous electrical connection from one electrode 40A-B to the other electrode 40A-B through the connector pin 23. The controller 102 then directs that a current (e.g., a low voltage AC current from a power source 104) be delivered through one of the electrical conductors 90A-B. This current travels from one electrode 40A-B to the other of the electrodes 40A-B through the connector pin 23 causing substantially instantaneous heating at the interface between the connector pin 23 and electrodes 40A-B due to resistive heating effects. The connector pin 23 is heated in seconds to the desired temperature (e.g., 220-360 deg. C.) whereby the solder 12 within the connector receptacle 24 is melted, see FIG. 6C.

Figures 6C, 6D, 6E:
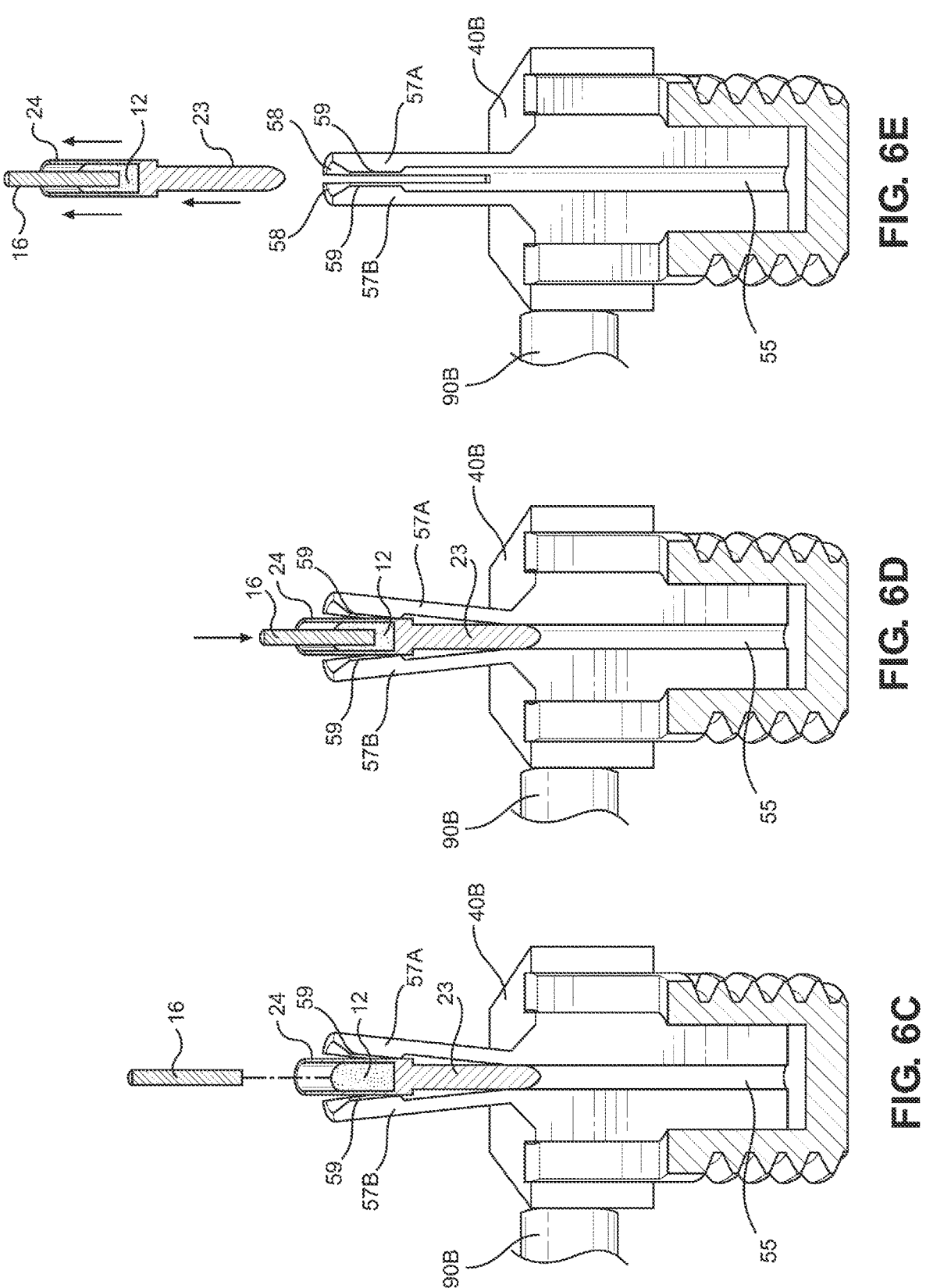
FIG. 6C is a cross-sectional view of the connector pin positioned within a heat receptacle to melt the solder.
FIG. 6D is a cross-sectional view of a wire inserted into the connector receptacle and the melted solder.
FIG. 6E is a cross-sectional view of the wire connected within the connector pin and the connector pin removed from the heat receptacle.

With the solder 12 melted within the connector receptacle 24, the wire 16 of the cable is inserted into the connector receptacle 24, see FIG. 6D (alternatively, one or more of the wires 16 of the cable 14 may be positioned within their respective connector pins 23 prior to resistive heating). Subsequently, power supplying the current is turned off to stop the resistive heating process, as directed by the controller 102, and the heat applicator device 30 is removed from the connector pin 23 by the three-dimensional positioning robotic arm 12, see FIG. 6E. The process is repeated for each individual connector pin 23, with the heat applicator device 30 repositioned to accommodate a different one of the plurality of connector pins 23 whereby resistive heating is applied to the respective connector pin to terminate the respective wire 16. Notably, the resistive heating causes the respective connector pin 23 to heat to a solder-melting temperature (e.g., 220-360 deg. C.) nearly instantaneously or within a few seconds; heat up time can be reduced by increasing the power that drives the current through the connector pin 23. At any time, the power that drives the current through the connector pin 23 can be turned off enabling the connector pin 23 and electrodes 40A-B to cool down to a safe-to-touch temperature within seconds once the current has stopped flowing.

In view of the above, it can be appreciated that the resistive heating wire termination system 10 of the present disclosure provides certain advantages over existing wire termination technologies. For example, the geometry of the electrodes 40A-B accommodates consistent resistive heating in very constrained spaces due to vary slim nature of the pin receptacle 60 and can be modified for any connector pin geometry. Further, the resistive heating localizes the heat distribution within the respective connector pin preventing the overheating of other connector pins or components in the electrical connector 20/cable 14 assembly. Another advantage includes the elimination of heat-up and cool-down time for the electrodes 40A-B and connector pin 23 as the resistive heating performed, when performed starting from room temperature, is nearly instantaneous.

Still other advantages include the modularity of the resistive heating wire termination system 10 where the electrical conductors 90A-B that enable the current to flow through the electrodes 40A-B are easily changed out through use of the set screws 94A-B as opposed to being permanently soldered to the electrodes 40A-B. Further, the resistive heating wire termination system 10 is designed to be implemented in an automated/robotic system thereby removing a human's role in heating each connector pin 23. Further still, the resistive heating wire termination system 10 uses less energy than conventional soldering irons or other methods that require constant power to maintain heat at the connector pin 23.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A method comprising:
inserting one of a plurality of wires of a cable into an interior cavity of a respective one of a plurality connector pins of an electrical connector;

applying resistive heating with a heat applicator device to the one of the plurality of connector pins, wherein the applied resistive heating serves to melt solder contained within the interior cavity of the one of the plurality of connector pins; and
stopping the resistive heating, wherein stopping the resistive heating enables the melted solder to solidify about the one of the plurality of wires within the interior cavity and establish an electrical connection between the one of the plurality of wires and the one of the plurality of connector pins;
wherein the heat applicator device comprises a first electrode and a second electrode placed proximate one another to form a pin receptacle that receives the one of the plurality of connector pins and wherein the received one of the plurality of connector pins within the pin receptacle electrically couples the first electrode and the second electrode; and
wherein each of the first and second electrodes includes a respective pin-receptacle portion and a conductor-receiving portion, wherein the pin-receptacle portion of each of the first and second electrodes form the pin receptacle and wherein the conductor-receiving portion of each of the first and second electrodes are separated by an isolation member.

2. The method of claim 1, wherein applying resistive heating comprises directing a current into the first electrode, through the one of the plurality of connector pins, and out the second electrode.

3. The method of claim 1, wherein a first electrical conductor is removably coupled to the first electrode and wherein a second electrical conductor is removably coupled to the second electrode.

4. The method of claim 3, wherein the first electrical conductor is removably coupled to the first electrode with a first set screw and wherein the second electrical conductor is removably coupled to the second electrode with a second set screw.

5. The method of claim 1, wherein the pin-receiving portion of each of the first and second electrodes is comprised of at least two prongs.

6. The method of claim 1, wherein the conductor-receiving portion of each of the first and second electrodes is of an isosceles trapezoid configuration.

7. The method of claim 1, wherein the heat applicator device is coupled to a movable arm.

8. The method of claim 1, wherein the electrical connector is coupled to a movable arm.

9. The method of claim 1, wherein the heat applicator device applies resistive heating to produce a temperature at the pin connector that is in the range of 220 to 360° C.

10. A method comprising:
inserting a first one of a plurality of wires of a cable into an interior cavity of a respective first one of a plurality connector pins of an electrical connector;
applying resistive heating with a heat applicator device to the first one of the plurality of connector pins, wherein the applied resistive heating serves to melt solder contained within the interior cavity of the first one of the plurality of connector pins;
stopping the resistive heating applied to the first one of the plurality of connector pins, wherein stopping the resistive heating enables the melted solder to solidify about the first one of the plurality of wires within the interior cavity and establish an electrical connection between the first one of the plurality of wires and the first one of the plurality of connector pins;

repositioning the heat applicator device;

inserting a second one of the plurality of wire of the cable into an interior cavity of a respective second one of the plurality of connector pins of the electrical connector;

applying resistive heating with the heat applicator device to the second one of the plurality of connector pins, wherein the applied resistive heating serves to melt solder contained within the interior cavity of the second one of the plurality of connector pins; and stopping the resistive heating applied to the second one of the plurality of connector pins, wherein stopping the resistive heating enables the melted solder to solidify about the second one of the plurality of wires within the interior cavity and establish an electrical connection between the second one of the plurality of wires and the second one of the plurality of connector pins;

wherein the heat applicator device comprises a first electrode and a second electrode placed proximate one another to form a pin receptacle that receives the first one and the second one of the plurality of connector pins and wherein the received first one and received second one of the plurality of connector pins in the pin receptacle electrically couples the first electrode and the second electrode, respectively; and wherein each of the first and second electrodes includes a respective pin-receptacle portion and a conductor-receiving portion, wherein the pin-receptacle portions of each of the first and second electrodes form the pin receptacle and wherein the conductor-receiving portion of each of the first and second electrodes are separated by an isolation member.

11. The method of claim 10, wherein applying resistive heating comprises directing a current into the first electrode, through the one of the plurality of connector pins, and out the second electrode.

12. The method of claim 10, wherein a first electrical conductor is removably coupled to the first electrode and wherein a second electrical conductor is removably coupled to the second electrode.

13. The method of claim 12, wherein the first electrical conductor is removably coupled to the first electrode with a first set screw and wherein the second electrical conductor is removably coupled to the second electrode with a second set screw.

14. The method of claim 10, wherein the pin-receiving portion of each of the first and second electrodes is comprised of at least two prongs.

15. The method of claim 10, wherein the conductor-receiving portion of each of the first and second electrodes is of an isosceles trapezoid configuration.

16. The method of claim 10, wherein the heat applicator device is coupled to a movable arm.

17. The method of claim 10, wherein the electrical connector is coupled to a movable arm.

18. The method of claim 10, wherein the heat applicator device applies resistive heating to produce a temperature at the first one and the second one of the pin connectors that is in the range of 220 to 360° C.

* * * * *